UNITED STATES PATENT OFFICE.

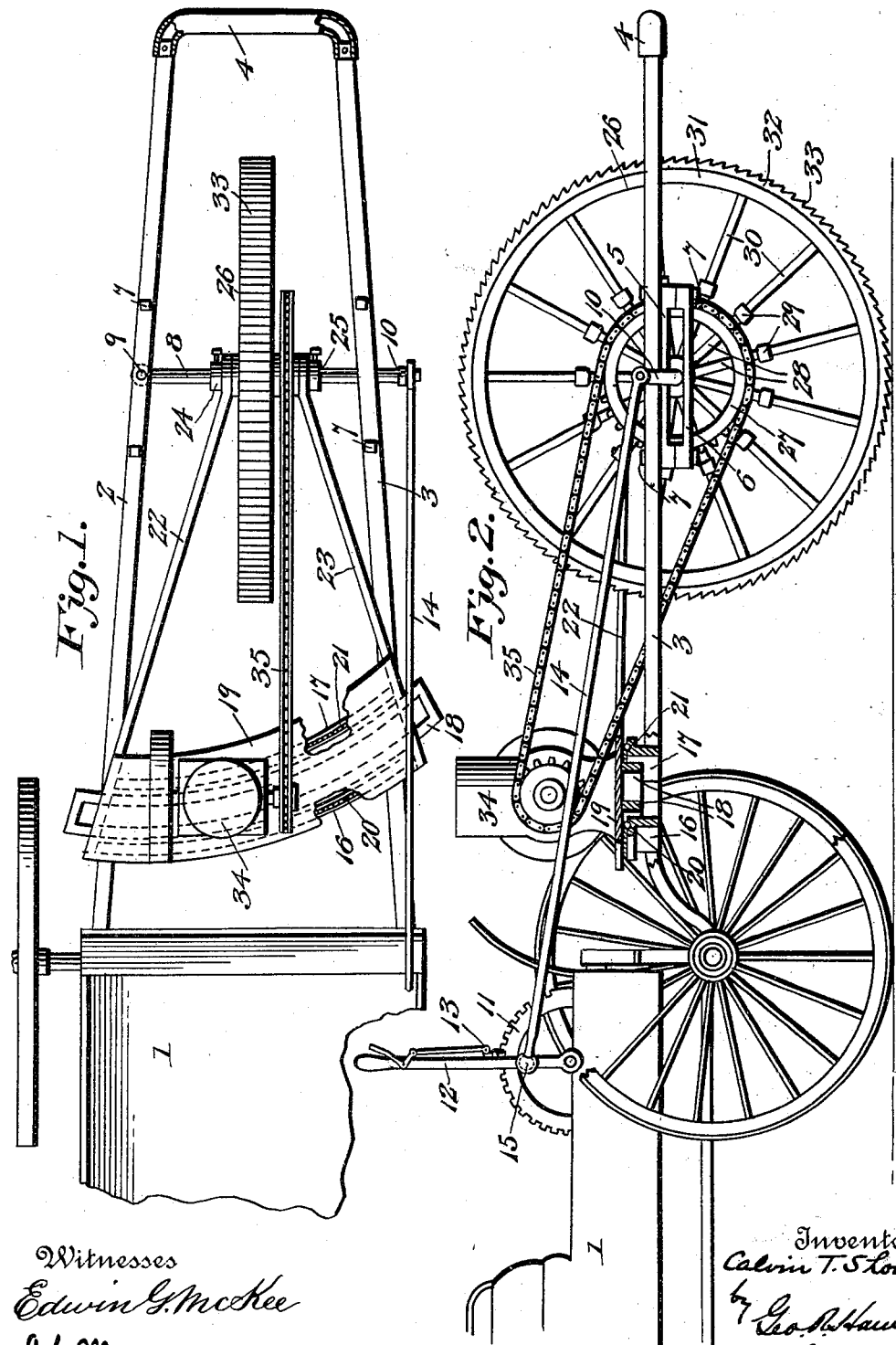

CALVIN T. SHOUP, OF PARSONS, KANSAS.

MOTOR-VEHICLE.

SPECIFICATION forming part of Letters Patent No. 658,046, dated September 18, 1900.

Application filed June 2, 1900. Serial No. 18,886. (No model.)

*To all whom it may concern:*

Be it known that I, CALVIN T. SHOUP, a citizen of the United States, residing at Parsons, in the county of Labette and State of Kansas, have invented certain new and useful Improvements in Motor-Vehicles; and I do hereby declare the following to be a full, clear, and exact description of the invention, such as will enable others skilled in the art to which it appertains to make and use the same.

My invention relates to motor-vehicles, and more particularly to the propelling and steering mechanism thereof.

One of the main objects of the present invention is to provide propelling and steering mechanism which can be applied to the shafts of vehicles as ordinarily constructed as a substitute for the horse, whereby the vehicle may be converted into a motor-vehicle at comparatively small expense and with little difficulty.

Another object is to obviate the necessity of building a special form of vehicle to accommodate the various mechanisms, as well as to obviate the necessity of remodeling a vehicle if it is desired to equip it with propelling mechanism and convert it into a motor-vehicle.

A further object of my invention is to provide propelling and steering mechanism which will be strong, durable, and efficient and capable of cheap manufacture, and which will be practically self-contained, so that it can be applied to the shafts of a road-vehicle or a sleigh without requiring special workmanship.

Having the foregoing objects and others not specifically mentioned in view, the invention consists of the novel and improved features and coöperating parts fully described hereinafter, and set forth in the appended claims.

In the accompanying drawings, Figure 1 is a plan view showing a vehicle equipped with my improvements, and Fig. 2 a side elevation with certain parts in section.

An ordinary road-vehicle is shown at 1 as provided with the usual shafts 2 and 3. In providing such a vehicle with my improvements I find it desirable in order to brace the shafts and make them sufficiently rigid to provide a cross connecting brace or tube 4, having bent ends, which are fitted over and secured to the tips of the shafts. To one of the shafts, preferably the right, I secure a guide-box composed of the two members 5 and 6, which are held together and secured to the shaft by the bolt 7. The numeral 8 designates an axle, which has one end bolted to the under side of the left shaft 2, as at 9, so that it is pivoted or hinged at this point to swing in a horizontal plane. The other end of the axle extends through the guide-box, being adapted to play therein, and is provided with a crank and wrist pin 10 at its outer end. On the vehicle in a suitable position I secure a quadrant 11 and pivot a guiding-lever 12, which can be thrown along the quadrant and locked at any point by the usual mechanism 13. This lever is connected to the wrist-pin by a steering-rod 14, which has a suitable universal or ball-and-socket connection with the lever at 15 in order to compensate for the lateral movement the steering-rod is subjected to when the axle 8 is being swung on its hinge or pivot. As will appear hereinafter, steering of the vehicle is accomplished through the proper manipulation of the lever 12 by the occupant of the vehicle.

Near the rear ends of the shafts there are located two arc-shaped plates 16 and 17, which have their ends secured to the shafts and which are arranged parallel to each other and are struck from the pivotal point 9 as a center. Between these plates is located an arc-shaped motor-base 18, provided with the top plate or table 19, between which and the plates 16 and 17 are interposed suitable ball-bearings 20 and 21 in order to reduce friction to a minimum. There are two braces 22 and 23, connected to the motor-base near the ends thereof and extending over the shafts down to the axle 8, which they have passed through them. On the axle are two collars 24 and 25, which hold the propelling-wheel 26 against lateral movement on the axle.

The propelling-wheel 26 is of a special construction in order to adapt it to this particular purpose which it is intended to serve. The hub, sprocket-wheel 27, and spokes 28 are all cast in a single piece to give strength and durability, and the outer ends of the spokes are provided with cup-shaped sockets 29, which receive the ends of wooden spoke-sections 30, which are suitably secured to a wooden felly 31. The tire 32, provided for the felly, is of steel and provided with teeth 33 of ratchet-like construction. The wheel is loosely mounted on the axle 8, and the peculiar construction of tire gives it the best possible tractive power and prevents slipping.

The top plate or table 19 is properly supported by the motor-base and the braces, and on this table is located the preferred form of motor 34 to be used, which is geared to the sprocket-wheel 27 by a sprocket-chain 35. Any type of motor can be employed and controlling devices provided on the vehicle for operating the same.

The weight of the motor, the propelling or driving wheel, and the other parts gives the driving-wheel a proper traction (which is supplemented by the improved construction of tire) to propel the vehicle at any speed which may be desired, this being a matter of motor control. When it is desired to proceed straight ahead, the controlling or guiding lever will be in substantially-upright position; but when it is desired to turn around or to the left or right the lever will be thrown forward or backward, as the case may be. When this is done, the axle will be shifted on its pivoted end as a hinge or pivot and the braces, motor-base, and table and the motor turned with it, so that the driving-wheel will become inclined in relation to the shafts and, acting at angle thereto, will turn said shafts bodily or direct them laterally in the direction in which it is proposed to go in the same manner that a horse would act. In this connection I desire to point out the advantage of pivoting or hinging one end of the axle, as the driving-wheel is then shifted or turned as an entirety and a more rapid turning movement is obtainable. I desire also to emphasize the fact that the mechanisms are applied to the shafts of the vehicle and are practically self-contained, thereby accomplishing the advantages heretofore pointed out.

Having thus described my invention, what I claim as new, and desire to secure by Letters Patent, is—

1. The combination with the shafts of a vehicle, of an axle which is pivoted or hinged to one of said shafts and has its other end free for movement in a horizontal plane, a driving or propelling wheel on said axle, a guide for the free end of the axle, in which the axle is adapted to move freely back and forth, a steering-lever on the vehicle and a steering-rod connecting the lever with the free end of the axle, said lever and rod being adapted by a straight back-and-forth movement to shift the free end of the axle in the guide and change the inclination of the propelling-wheel.

2. The combination with the shafts of a vehicle, of an axle hinged or pivoted to one of the shafts and having its other end free for movement, a driving-wheel on said axle, a motor-base connected to the axle and adapted to swing therewith, a motor on said base adapted for driving the wheel, and means for shifting the free end of the axle to incline the driving-wheel and accomplish the steering of the vehicle.

3. The combination with the shafts of a vehicle, of an axle hinged or pivoted to one of said shafts and having its other end free for movement, an arc-shaped motor-base support connected to the shafts of the vehicle, a motor base and table of arc shape movable on said support, braces connecting the motor-base to the axle, a driving or propelling wheel on said axle, a motor on said base which is adapted to turn the wheel, and means for shifting the axle, whereby the steering of the vehicle is accomplished.

4. The combination with the shafts of a vehicle, of an axle adapted for shifting horizontally which is carried by the shafts, a driving or propelling wheel on said axle which is provided with a hub, spokes, and sprocket-wheel all cast integral, a motor-base connected to the axle and adapted to move therewith, and a motor on said base having a sprocket-chain connected with the sprocket-wheel, and means of shifting the axle to accomplish the steering of the vehicle.

5. The combination with the shafts of a vehicle, of an axle pivoted or hinged to one of said shafts, a guide on the other shaft in which the free end of the axle moves, a steering-lever on the vehicle, having an operative connection with the free end of the axle, arc-shaped plates secured to the shafts and struck from the pivotal point of the axle as a center, a motor-base having a table extending over the said plates, balls interposed between the table and the plates, braces connecting the base to the axle, a driving-wheel loose on the axle between the braces and provided with a sprocket-wheel, collars on the axle and abutting the braces, a motor on the motor-base and table, and a sprocket-chain connecting said motor to the sprocket-wheel aforesaid.

In testimony whereof I affix my signature in presence of two witnesses.

CALVIN T. SHOUP.

Witnesses:
ALEXANDER WIRTH,
ROBERT H. CLOUGHLEY.